J. P. TARNUTZER.
Rotary Cultivator.
No. 64,262.
Patented Apr. 30, 1867.
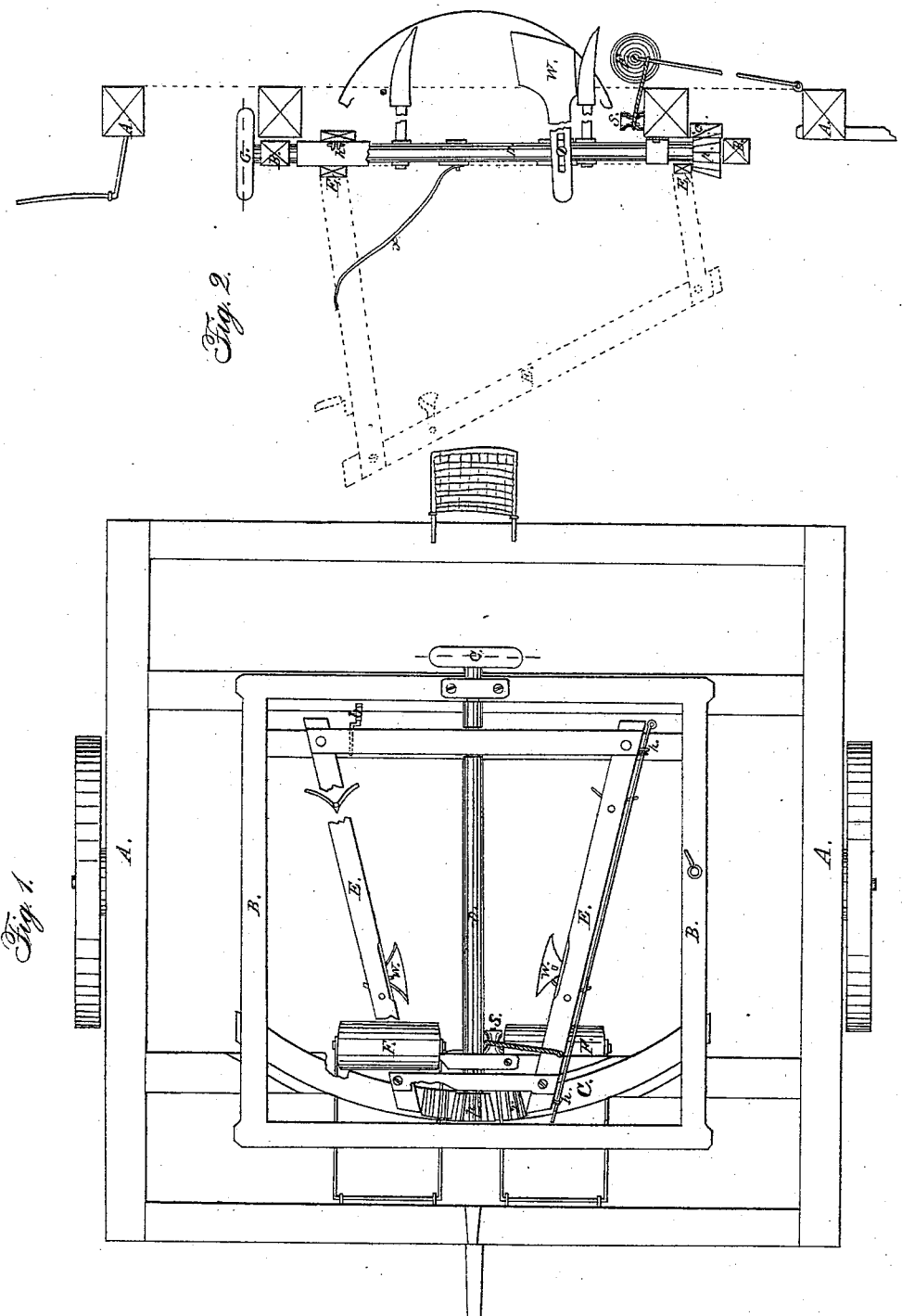
Witnesses:
Henry F. Rose
Wm Korn
Inventor:
John P. Tarnutzer

United States Patent Office.

JOHN P. TARNUTZER, OF FOND DU LAC, WISCONSIN.

Letters Patent No. 64,262, dated April 30, 1867.

---

IMPROVEMENT IN CULTIVATORS.

---

*The Schedule referred to in these Letters Patent and making part of the same.*

---

Be it known that I, JOHN P. TARNUTZER, of the city and county of Fond du Lac, and State of Wisconsin, have invented a new and useful Improvement on Cultivators; and I do hereby declare that the following is a full, clear, and exact description of the construction and operation of the same, reference being had to the annexed drawings, making a part of this specification, in which—

Figure 1 is a horizontal or top view.

Figure 2 is a transverse section, showing frame E when raised.

A is the main frame of the cultivator, upon which the wheels are. B is a smaller frame resting upon the main frame. C is that portion of the smaller frame in shape of an arc fastened upon the frame B, on the upper side of which arc is placed a pinion rack, $r$. D is a shaft, with pinion $p$ on one end, which, working in the pinion rack, turns the smaller frame B, and having on the outer end a capstan-head, $c$, by which shaft D is turned around. The shaft passes through the smaller frame at a point near the capstan-head. E is the frame of the cultivator, in which the cultivator teeth are fastened. This frame E is fastened into frame B by hinges, $h\ h$, said frame resting in front upon the arc C, so that as the frame B is moved from right to left, and *vice versa*, the cultivator frame moves with it. F F are two rollers, hung to the front beam of the main frame A by iron eyes and rods. The rods on each roller are fastened together by a chain, which passes over the sheave or roller $s$, and running to upper part of frame E, where it is fastened. $b$ is a handle, by which frame E is raised. $w\ w$ are wings fastened to frame E, to be raised at pleasure higher or lower to regulate quantity of dirt to be turned upon the plant. $t$ is a spring or arm for catching and holding up frame E when raised.

The following is a description of the operation of the machine: The driver with his foot can press upon the bars of the capstan-head $c$, and thus turning the shaft D the frame E is lifted laterally. This is done by the pinion turning in a pinion rack. In this way the cultivator may be guided to suit the position of the rows of corn or other plants. The rollers are for levelling the dirt and pressing down the weeds, so that the cultivator teeth may effectually cover them with dirt.

When passing over stumps, stones &c., or taking the cultivator to and from the field, by lifting on the handle $b$ the frame E is raised up, and turned up to the left far enough to be caught and held by the spring $t$, which is long enough to be within reach of the driver's hand. The raising up of frame E also raises the rollers F F by means of the chain passing over the sheaves.

I claim as my invention—

The shaft D, with pinion $p$, and pinion rack $r$, and capstan-head $c$, and movable frame B.

Also, the rollers F F and sheave $s$, upon which chain passes.

Also, the hinges $h\ h$, upon which the frame E is hung.

Also, the wings $w\ w$.

Also, the movable frame B.

Dated at Fond du Lac, Wisconsin, November 7, 1866.

JOHN P. TARNUTZER.

Witnesses:
HENRY F. ROSE,
WM. HORN.